United States Patent [19]

DeJager

[11] Patent Number: 5,272,568
[45] Date of Patent: Dec. 21, 1993

[54] HIGH APERTURE FINITE CONJUGATE LENS SYSTEM

[75] Inventor: Donald DeJager, Rochester, N.Y.

[73] Assignee: Eastman Kodak Company, Rochester, N.Y.

[21] Appl. No.: 805,164

[22] Filed: Dec. 11, 1991

[51] Int. Cl.⁵ .............................................. G02B 9/62
[52] U.S. Cl. ................................... 359/758; 359/740
[58] Field of Search .................... 359/758, 642, 740

[56] References Cited

U.S. PATENT DOCUMENTS

| | | | |
|---|---|---|---|
| 4,080,048 | 3/1978 | Kimura | 350/214 |
| 4,130,350 | 12/1978 | Koizumi | 350/216 |
| 4,206,974 | 6/1980 | Maeda | 350/215 |
| 4,251,131 | 2/1981 | Tojo | 350/414 |
| 4,364,644 | 12/1982 | Ikemori | 350/464 |
| 4,368,957 | 1/1983 | Chirra | 350/469 |
| 4,505,553 | 3/1985 | Asoma | 350/414 |
| 4,521,086 | 6/1985 | Kurita | 350/464 |
| 4,537,472 | 8/1985 | Asoma | 350/414 |
| 4,563,060 | 1/1986 | Yamagishi | 350/414 |
| 4,591,243 | 5/1986 | Yamagishi | 350/414 |
| 4,753,522 | 6/1988 | Nishina et al. | 359/758 X |
| 4,830,474 | 5/1989 | Nakayama et al. | 359/758 X |
| 4,955,701 | 9/1990 | Kataoka et al. | 350/481 |

Primary Examiner—Scott J. Sugarman
Attorney, Agent, or Firm—Svetlana Z. Short

[57] ABSTRACT

A high aperture finite conjugate lens suitable for use in applications requiring high numerical aperture on both object and image sides of the lens such as in a laser thermal printer system. The lens system has six lens components, the first lens component is identical to the sixth lens component but is reversed in orientation; and the third lens component is identical to the fourth lens component, but is reversed in orientation.

19 Claims, 1 Drawing Sheet

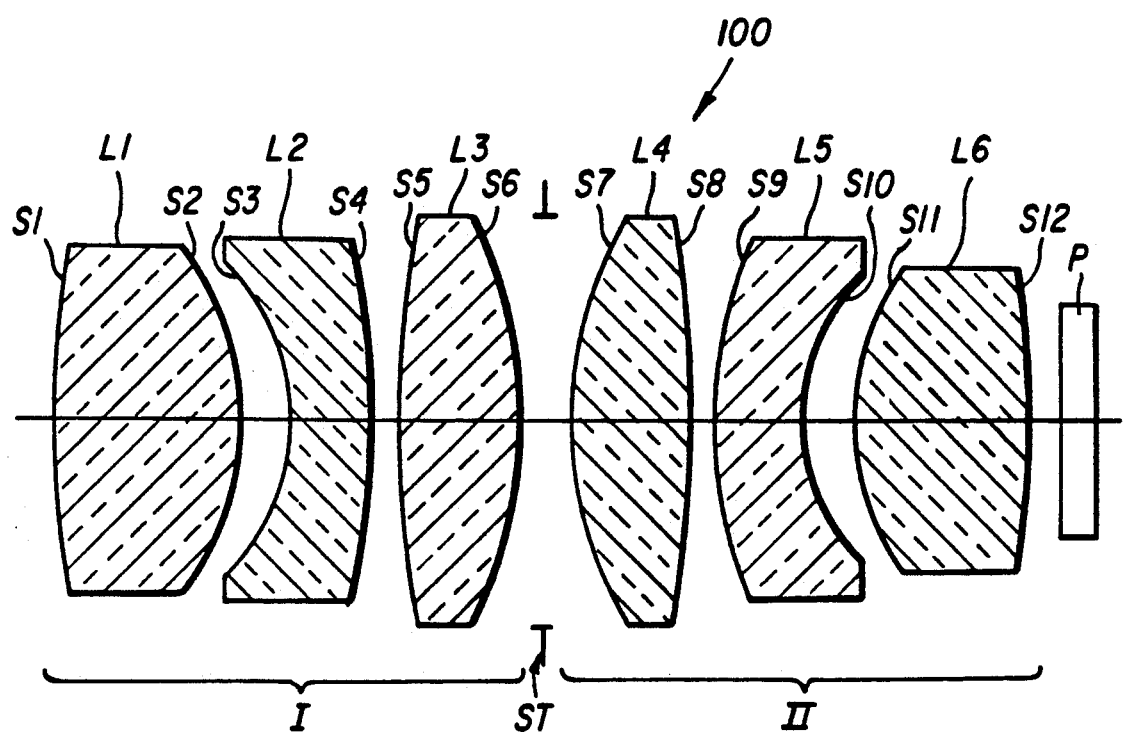

HIGH APERTURE FINITE CONJUGATE LENS SYSTEM

BACKGROUND OF THE INVENTION

Related Applications

The present application is related to the following commonly assigned co-pending applications: U.S. Ser. No. 749,396, filed Aug. 23, 1991, entitled HIGH APERTURE FINITE CONJUGATE LENS SYSTEM SUITABLE FOR USE AS A MICRO RELAY LENS, in the name of Donald DeJager; and U.S. Ser. No. 749,394, filed Aug. 23, 1991, entitled A THERMAL PRINTER SYSTEM WITH A HIGH APERTURE MICRO RELAY LENS SYSTEM, in the names of Donald DeJager and Seung-Ho Baek, incorporated by reference herein.

TECHNICAL FIELD

This invention relates generally to finite conjugate lens systems and more particularly to a well corrected finite conjugate micro relay lens system having high numerical apertures on both object and image sides.

BACKGROUND ART

The lens system of this invention is suited for particular application in projecting a fiber optic-laser diode linear array onto a thermally sensitive medium in a thermal printer. However, it has general application to systems requiring high numerical apertures on both object and image sides while working at finite conjugates.

Commercially available high aperture systems such as microscope objectives and Petzval-type lenses are generally designed for an object location which is far from the lens system when compared to the location of the image. A typical magnification provided by a microscope objective is 40:1 and while the numerical aperture of the lens system is high on the image side, it is low on the object side. For a laser thermal printer, a micro relay lens system requires high numerical apertures on both object and image sides of the lens system.

SUMMARY OF THE INVENTION

The object of this invention is to provide a low cost, high speed, well corrected, finite conjugate imaging lens system, with unusually high numerical apertures on both image and object sides of the lens system.

Accordingly, the present invention provides a finite conjugate lens system having high numerical apertures on both object and image sides, the lens system comprising an aperture stop located approximately at the center of the high aperture lens system and six lens components centered on an optical axis and arranged into two lens groups of positive power to provide the high numerical apertures on both the object and the image sides of the lens system. The two lens groups are located on each side of the aperture stop and each lens group comprises an outer-most lens element and an inner-most lens element. The inner lens elements are located in close proximity to the aperture stop and each of the inner-most lens elements has a convex surface facing towards the aperture stop.

BRIEF DESCRIPTION OF THE DRAWINGS

The accompanying figure is a profile drawing of an optical system of an illustrative embodiment of the invention, whose design is optimized for numerical apertures of 0.15 and 0.3 for the object and image sides respectively.

BEST MODE FOR CARRYING OUT THE INVENTION

The lens system of the present invention has a general application to systems requiring a high numerical aperture on both object and image side while working at finite conjugates. An example of one such application is the use of the lens system in a thermal printer system such as described in U.S. application No. 749,394, and which is incorporated by reference herein.

The lens system 100 of a preferred embodiment of the present invention is illustrated in the accompanying figure. The numerical aperture of the beam on the object side of the lens system is 0.15, and the numerical aperture of the beam on the image side of the lens system is 0.3. The ANSI f-number of the lens system is 1.11. The semi field angle is 2.54 degrees. The distance from the object to the image is 50.8 mm. The lens system 100 is used in the near infrared (760 to 860 mm) to relay an object having a diameter of 3.0 mm to an image of diameter 1.5 mm giving a magnification of ½. The lens system 100 is used to form an image of a source comprised of a linear array of fibers, each transmitting energy from remotely located infrared laser diodes. The combination of high numerical aperture and sharp imagery over an extended field of view dictated the need for a new lens of a very unusual construction.

The lens system 100 comprises six lens elements organized in two lens groups, I and II. An aperture stop ST is located approximately at the center of the lens system between the two lens groups I and II. Following from object to image, the lens elements are: a biconvex positive singlet L1, a meniscus negative singlet L2 with a concave surface S3 facing an object and a convex surface S4 towards an aperture stop ST, a biconvex positive singlet L3 located near the aperture stop, a bi-convex positive lens element L4, a meniscus negative L5, and a biconvex positive singlet L6. The numerical data for the optical system is as follows:

| SURFACE | CLEAR APER. | RADIUS | THICKNESS | MATERIAL |
|---|---|---|---|---|
| S1 | 7.04 | 29.3420 | 4.550 | 517642 |
| S2 | 7.21 | −6.55540 | 1.160 | |
| S3 | 6.43 | −5.08020 | 2.000 | 785258 |
| S4 | 7.53 | −55.2081 | 0.510 | |
| S5 | 8.00 | 35.1825 | 3.140 | 517642 |
| S6 | 8.54 | −10.5919 | 0.500 | |
| | 8.49 | DIAPHRAGM | 0.500 | |
| S7 | 8.70 | 10.5919 | 3.140 | 517642 |
| S8 | 8.30 | −35.1825 | 0.500 | |
| S9 | 7.61 | 9.22950 | 2.000 | 785258 |
| S10 | 6.13 | 4.66120 | 1.340 | |
| S11 | 6.25 | 6.55540 | 4.550 | 517642 |
| S12 | 5.23 | −29.3420 | 0.510 | |
| S13 | 4.90 | PLANO | 1.000 | 517642 |
| S14 | 4.55 | PLANO | | |
| | | LENS LENGTH | 25.4 | |

An unusual feature of this design is the use of two lens elements in one lens group that are identical but reversed in direction from two lens elements included in the second lens group; i.e. lens elements L1 and L6 are identical and lens elements L3 and L4 are identical in their structure. The term identical means that these have the same radii of curvature, the same thickness and are made of the same type of material, although their aperture sizes are different depending on the position that they occupy within the lens system. This feature permits for lower manufacturing costs.

For the purposes of this application, a protection plate P, shown in the accompanying figure, is not considered to be a lens element.

Although in the preferred embodiment the lens element's surfaces are spherical, in a modification, aspherical surfaces can be used.

The invention has been described in detail with particular reference to a preferred embodiment thereof, but it will be understood that variations and modifications can be effected within the spirit and scope of the invention.

I claim:

1. A finite conjugate lens system having high numerical apertures on both object and image sides comprising an aperture stop located approximately at the center of said high aperture lens system and size lens components centered on an optical axis and arranged into two lens groups of positive power, said lens components having sufficient powers, spacings and clear apertures to provide said high numerical apertures on both object and image sides of said lens system, one of said lens groups being located to one side of said aperture stop and another of said lens groups being located to a second side, said lens groups each comprising an outer-most lens element and an inner-most lens element, said inner-most lens element of each group being located in close proximity to said aperture stop, and having a convex surface facing towards said aperture stop, wherein said high numerical apertures of the lens system are at least 0.15 or higher.

2. A finite conjugate lens system according to claim 1, wherein each of the lens components is a single lens element.

3. A finite conjugate lens system according to claim 2, wherein said two lens groups each include a lens element with a concave surface facing away from said aperture stop.

4. A finite conjugate lens system according to claim 2 having two identical pairs of lens elements.

5. A finite conjugate lens system according to claim 1, wherein said two lens groups are a front lens group and a rear lens group, said front lens group located in front of said aperture stop, said rear lens group located behind said aperture stop, said front lens group and said rear group each comprising three lens components and two pairs of lens components in said lens system are identical.

6. A finite conjugate lens system according to claim 5 wherein a first lens component is identical to a sixth lens component and a third lens component is identical to a fourth lens component.

7. A finite conjugate lens system according to claim 5 and wherein two pairs of lens components are identical.

8. A finite conjugate lens system according to claim 7, wherein said first lens component is identical to said sixth lens component but said sixth component is reversed in orientation; and said third lens component is identical to said fourth lens component but said fourth component is reversed in orientation.

9. A finite conjugate lens system according to claim 7, wherein each of said lens components is a single lens element.

10. A finite conjugate lens system according to claim 8, wherein each of said lens components is a single lens element.

11. A finite conjugate lens system according to claim 10, satisfying the following design parameters:

| SURFACE | CLEAR APER. | RADIUS | THICKNESS | MATERIAL |
|---|---|---|---|---|
| S1 | 7.04 | 29.3420 | 4.550 | 517642 |
| S2 | 7.21 | −6.55540 | 1.160 | |
| S3 | 6.43 | −5.08020 | 2.000 | 785258 |
| S4 | 7.53 | −55.2081 | 0.510 | |
| S5 | 8.00 | 35.1825 | 3.140 | 517642 |
| S6 | 8.54 | −10.5919 | 0.500 | |
| | 8.49 | DIAPHRAGM | 0.500 | |
| S7 | 8.70 | 10.5919 | 3.140 | 517642 |
| S8 | 8.30 | −35.1825 | 0.500 | |
| S9 | 7.61 | 9.22950 | 2.000 | 785258 |
| S10 | 6.13 | 4.66120 | 1.340 | |
| S11 | 6.25 | 6.55540 | 4.550 | 517642 |
| S12 | 5.23 | −29.3420 | 0.510 | |
| S13 | 4.90 | PLANO | 1.000 | 517642 |
| S14 | 4.55 | PLANO | | |
| | | LENS LENGTH | 25.4 | |

12. A finite conjugate lens system having high numerical apertures of at least 0.15 on both object and image sides comprising an aperture stop located between two lens groups of three lens components each, each lens group being of positive power, said lens components having sufficient power, spacings and clear apertures to provide said high numerical apertures of 0.15 or higher on both object and image sides of said lens system, wherein each of said lens group comprises in order a positive, negative and a positive lens component.

13. A finite conjugate lens system according to claim 12, wherein said groups of lens elements each include a lens element with a concave surface facing away from said aperture stop.

14. A finite conjugate lens system according to claim 13, wherein said lens element with a concave surface is a second element from the aperture stop.

15. A finite conjugate lens system according to claim 12, wherein every positive lens component in said system has a convex surface facing the aperture stop.

16. A finite conjugate lens system according to claim 12, wherein each of said three lens components is a single lens element.

17. A finite conjugate lens system, having high numerical apertures on both object and image sides comprising an aperture stop located approximately at the center of said high aperture lens system and a plurality of lens elements arranged into two lens groups of positive power, said lens elements having sufficient powers, spacings and clear apertures to provide said high numerical apertures on both object and image sides of said lens system, said lens groups located on each side of said aperture stop, said lens system comprising from the object side a biconvex positive lens component; a negative lens component with a strongly curved concave surface facing away from the aperture stop; a biconvex positive lens component, the aperture stop; a biconvex positive lens component; a negative lens component having a strongly curved concave surface facing away from the aperture stop; and a biconvex positive lens element, wherein said high numerical apertures of said lens system are 0.15 or higher.

18. A finite conjugate lens system having high numerical apertures on both object and image sides, said lens having a numerical aperture of 0.2 or larger at the short conjugate side and comprising an aperture stop located approximately at the center of said high aperture lens system and six lens components arranged into two lens groups of positive power, said lens components having sufficient powers, spacings and clear apertures to provide said high numerical apertures on both object and image sides of said lens system, one of said lens groups being located to one side of said aperture stop and another of said lens groups being located to a second side, said lens groups each comprising an outer-most lens element and an inner-most lens element, said inner-most lens element of each group being located in close proximity to said aperture stop, and having a convex surface facing towards said aperture stop.

19. A finite conjugate lens system, having high numerical apertures on both object and image sides comprising an aperture stop located approximately at the center of said high aperture lens system and a plurality of lens elements arranged into two lens groups of positive power, said lens elements having sufficient powers, spacings and clear apertures to provide said high numerical apertures on both object and image sides of said lens system, said numerical apertures being 0.15 or higher, said lens groups located on each side of said aperture stop, said lens system comprising from the object side a biconvex positive lens components; a negative lens component with a strongly curved concave surface facing away from the aperture stop; a biconvex positive lens component, the aperture stop; a biconvex positive lens component; a negative lens component having a strongly curved concave surface facing away from the aperture stop; and a biconvex positive lens element, and wherein two pairs of lens components are identical.

* * * * *